(12) United States Patent
Keller et al.

(10) Patent No.: US 9,286,238 B1
(45) Date of Patent: Mar. 15, 2016

(54) SYSTEM, APPARATUS, AND METHOD OF CACHE MANAGEMENT

(71) Applicant: EMC Corporation, Hopkinton, MA (US)

(72) Inventors: Itay Keller, Ramat Gan (IL); Philip Derbeko, Modiin (IL)

(73) Assignee: EMC Corporation, Hopkinton, MA (US)

( * ) Notice: Subject to any disclaimer, the term of this patent is extended or adjusted under 35 U.S.C. 154(b) by 194 days.

(21) Appl. No.: 14/145,284

(22) Filed: Dec. 31, 2013

(51) Int. Cl.
*G06F 12/02* (2006.01)
*G06F 12/12* (2006.01)

(52) U.S. Cl.
CPC .................................. *G06F 12/125* (2013.01)

(58) Field of Classification Search
CPC ........................................................ G06F 12/125
USPC ................. 711/136, 112, 114, 154, 156, 160
See application file for complete search history.

(56) References Cited

U.S. PATENT DOCUMENTS

| | | | |
|---|---|---|---|
| 5,418,921 A * | 5/1995 | Cortney | G06F 11/1008 711/113 |
| 5,845,104 A * | 12/1998 | Rao | G06F 3/0601 711/111 |
| 6,167,489 A * | 12/2000 | Bauman | G06F 13/4239 711/119 |
| 6,460,122 B1 * | 10/2002 | Otterness | G06F 11/1076 711/122 |
| 6,981,106 B1 * | 12/2005 | Bauman | G06F 12/0822 711/146 |
| 7,124,169 B2 * | 10/2006 | Shimozono | G06F 17/30197 707/E17.005 |
| 7,210,001 B2 * | 4/2007 | Frey | G06F 11/1076 710/56 |
| 7,356,650 B1 * | 4/2008 | Englin | G06F 12/0811 711/134 |
| 7,472,228 B2 * | 12/2008 | McKenney | G06F 9/526 707/E17.007 |
| 7,475,196 B2 * | 1/2009 | Arimilli | G06F 12/0822 711/119 |
| 7,917,712 B2 * | 3/2011 | Collins | G06F 12/1483 709/221 |
| 8,024,527 B2 * | 9/2011 | Arimilli | G06F 9/30043 711/146 |
| 8,990,510 B2 * | 3/2015 | McKenney et al. | G06F 9/526 711/141 |
| 2010/0293337 A1 * | 11/2010 | Murphy | G06F 12/0866 711/136 |
| 2014/0068183 A1 * | 3/2014 | Joshi | G06F 3/0659 711/114 |

* cited by examiner

*Primary Examiner* — Stephen Elmore
(74) *Attorney, Agent, or Firm* — Krishnendu Gupta; Konrad R. Lee

(57) ABSTRACT

A computer-executable method, system, and computer program product of managing a data storage system, wherein the data storage system includes a cache and a data storage array, the computer-executable method, system, and computer program product comprising initializing the cache, wherein the initializing comprises creating a first list related to data stored on the cache, and creating a second list related to data stored on the data storage array, updating the first list based on received I/O requests, updating the second list based on received I/O requests, and managing data on the cache based on the first list and the second list.

20 Claims, 10 Drawing Sheets

SYSTEM, APPARATUS, AND METHOD OF CACHE MANAGEMENT

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

A computer-executable method, system, and computer program product of managing a data storage system, wherein the data storage system includes a cache and a data storage array, the computer-executable method, system, and computer program product comprising initializing the cache, wherein the initializing comprises creating a first list related to data stored on the cache, and creating a second list related to data stored on the data storage array, updating the first list based on received I/O requests, updating the second list based on received I/O requests, and managing data on the cache based on the first list and the second list.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

Like reference symbols in the various drawings indicate like elements.

DETAILED DESCRIPTION

Figure 1:
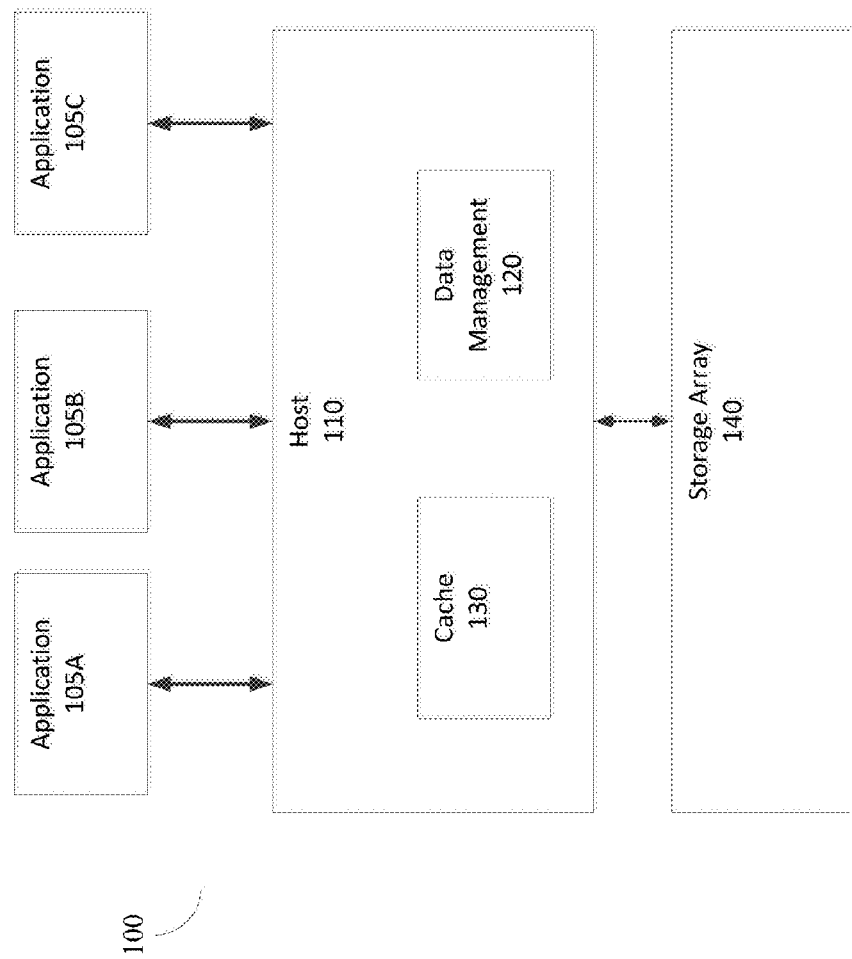
FIG. 1 is a simplified illustration of a data storage system, in accordance with an embodiment of the present disclosure.

Typically, data storage systems are relied upon to provide high performance solutions. Traditionally, high performance solutions mean that a data storage system is fast, reliable, and efficient in their use of data storage resources. Generally, performance of a data storage system may be affected by where, within the data storage system, data is stored and whether the data storage system is enabled to predict future I/O requests. Conventionally, being able to improve performance of predictive systems within a data storage system may be beneficial to the performance of a data storage system.

In many embodiments, the current disclosure may enable increased performance of a data storage system by actively initiating the eviction process of cache areas. In various embodiments the current disclosure may enable monitoring of I/Os received by the data storage system to determine which portions of data storage may be most recently used and/or may be more commonly used by applications using the data storage system. In certain embodiments, the current disclosure may enable a data management module to move data from active areas of a source disk to cache before cache evicts data stored within. In some embodiments, active areas of a source disk may be pre-mapped to portions of cache.

In many embodiments, a data management module may be enabled to manage portions of cache related to portions of data stored in a data storage array. In various embodiments, a portion of data may include an extent, Lun, or other contiguous area of a data storage array. In certain embodiments, contiguous areas may be enabled to map to cache which may enable efficient use of cache when accessing a particular set and/or contiguous area. In certain embodiments, a data management module may analyze and/or rank data stored within a data storage system. In other embodiments, ranking may include ordering data within a data storage system by Most Recently Used (MRU), Least Recently Used (LRU), and/or other methods of ordering data.

In many embodiments, data storage management module may be enabled to maintain a list and/or queue of data stored within cache. In various embodiments, data storage management module may be enabled to maintain a list and/or queue of data stored within each contiguous area within the data storage system. In some embodiments, a data storage management module may be able to rank data on the data storage system based on a list and/or queue of data stored within cache and contiguous areas within a data storage system.

In many embodiments, a data storage management module may periodically refresh each ranked list and/or queue to determine an optimal usage of cache. In various embodiments, an optimal usage of cache may mean removing low ranking cached data from cache and replacing the low ranking cached data with higher ranking data from one or more contiguous areas in the data storage system. In certain embodiments, a data storage management module may be enabled to predict disk access and may be enabled to effectively prefetch active areas of data storage into cache.

Refer to the example embodiment of FIG. 1. FIG. 1 is a simplified illustration of a data storage system, in accordance with an embodiment of the present disclosure. As shown, Data storage system 100 includes Host 110 which includes data management module 120 and cache 130 and is in communication with data storage array 140. Application (105A-C, 105 generally) are in communication with data storage system 100 and are utilizing host 110 and data storage array 140 to fulfill data storage needs of application 105.

Figure 2:
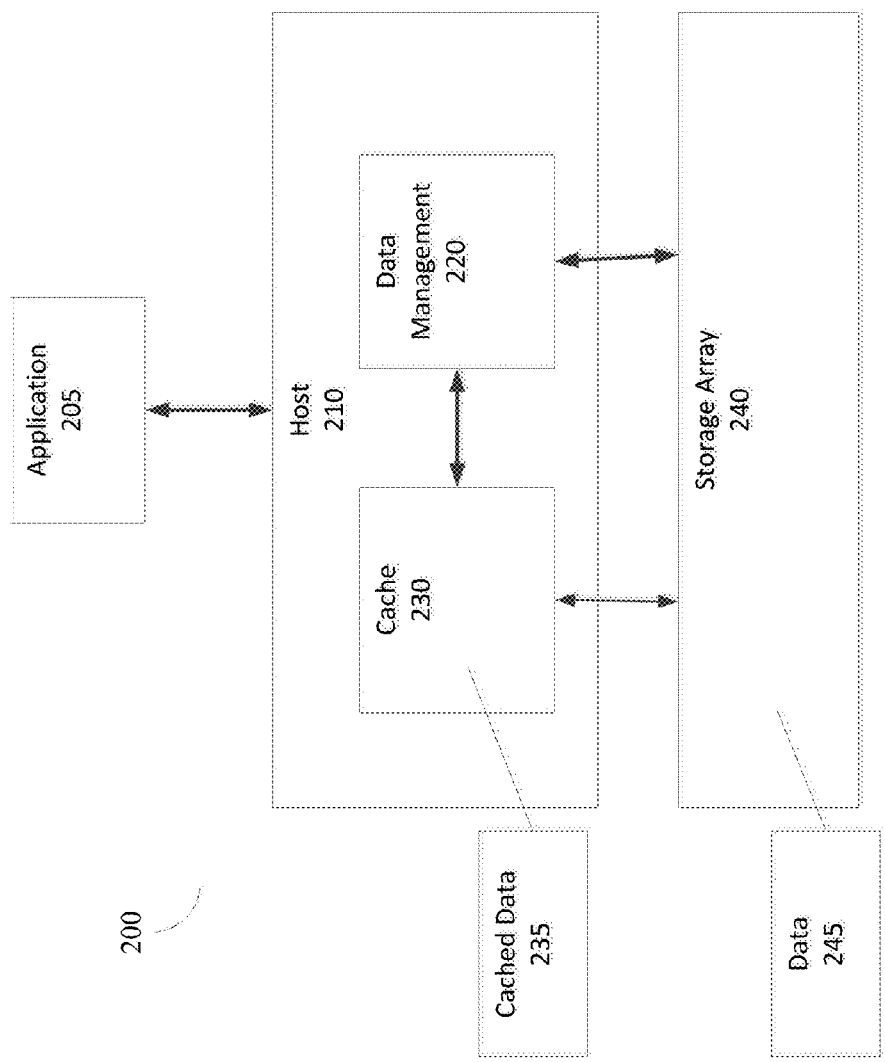
FIG. 2 is an alternate simplified illustration of a data storage system, in accordance with an embodiment of the present disclosure.

Refer to the example embodiment of FIG. 2. FIG. 2 is an alternate simplified illustration of a data storage system, in accordance with an embodiment of the present disclosure. As shown, data storage system 200 includes host 210 and data storage array 240. Host 210 includes cache 230 and data management 220. In this embodiment, data management module 220 is enabled to manage cached data 235 and data 245 stored on cache 230 and data storage array 240, respectively.

Figure 3:
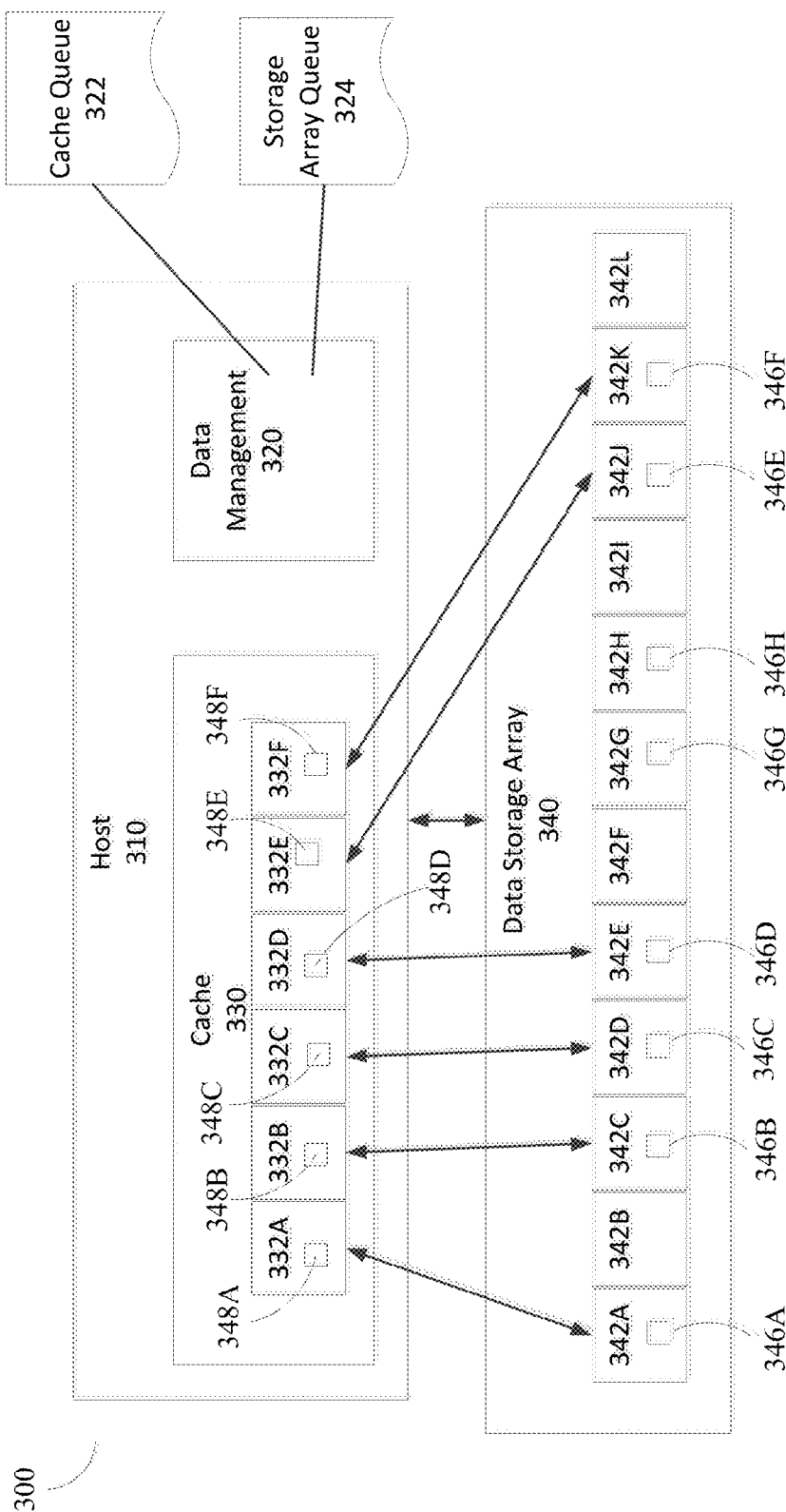
FIG. 3 is a simplified illustration of caching on a data storage system, in accordance with an embodiment of the present disclosure.

Refer to the example embodiment of FIG. 3. FIG. 3 is a simplified illustration of a data storage system mapping cache to contiguous areas in a data storage array, in accordance with an embodiment of the present disclosure. As shown, data storage system 300 includes Host 310 and data storage array 340. In this embodiment, Data Storage Array 340 includes contiguous areas (342A-L, 342 generally). As shown, a subset of contiguous areas 342 contain data blocks (346A-H, 346 generally). Each data block 346 is enabled to be mapped to portions (332A-F, 332 generally) of cache 330. In this embodiment, data block 346A is mapped to cached block 348A on portion 332A. Data block 346B is mapped to cached block 348B on portion 332B. Data block 346C is mapped to cached block 348C on portion 332C. Data block 346D is mapped to cached block 348D on portion 332D. Data block 346E is mapped to cached block 348E on portion 332E. Data block 346F is mapped to cached block 348F on portion 332F. Data blocks 346G, 346H are stored on contiguous areas 342G, 342H. As shown, data blocks 346G, 346H are enabled to be stored on cache 330, however, data blocks 346G, 346H are not currently stored in cache.

In this embodiment, data management module 320 is enabled to maintain a cache queue 322 and data storage array queue 324. Cache queue 322 is a list of data stored within cache 330 ranked by Least Recently Used. Data Storage Array Queue 324 is a list of data stored within data storage array 340 ranked by Least Recently Used. Data management module 320 is enabled to analyze incoming I/O to populate cache Queue 322 and Data storage array queue 324. Data management module 320 is enabled to utilize cache queue 322 and Data storage array queue 324 to make determinations of whether data blocks stored on data storage array 340 should be cached on cache 330. Data management module 320 is enabled to actively evict data blocks from cache 330 and cache data blocks from data storage array 340 to cache 330. In many embodiments, a data management module may be enabled to evict a data block from cache that is the lowest ranked element in a cache queue. In various embodiments, a data management module may be enabled to fill an empty portion of cache with the highest ranked element in the data storage array queue.

Figure 4:
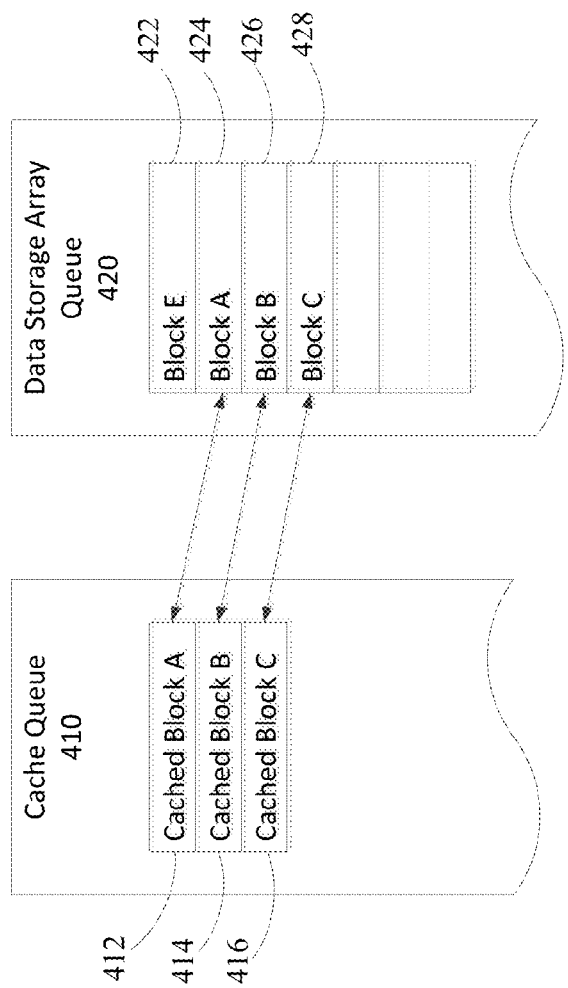
FIG. 4 is a simplified illustration of a data storage system managing cache usage, in accordance with an embodiment of the present disclosure.

Refer to the example embodiment of FIG. 4. FIG. 4 is a simplified illustration of internal queues of a data management module, in accordance with an embodiment of the present disclosure. As shown, Cache queue 410 and Data storage array queue 420 each include tables of data block stored within Cache 230 (FIG. 2) and Data Storage Array 240 (FIG. 2) respectively. In this embodiment, cache queue 410 notes that Cache 230 (FIG. 2) is caching data blocks 412, 414, 416 which are mapped from data blocks 424, 426, 428. Data Storage array queue 420 notes that Data Storage Array 240 (FIG. 2) is storing data blocks 422, 424, 426, 428. Within Cache queue 410, data blocks 412, 414, 416 are ordered by Least Recently Used, where data block 412 has been accessed most recently and data block 416 has been accessed least recently. Within Data storage Array Queue 420, data blocks 422, 424, 426, 428 are ordered by Least Recently Used, where data block 422 has been accessed most recently and data block 428 has been accessed least recently. In many embodiments, a data management module may be enabled to evict a lower ranking data block stored in cache for a higher ranking data block stored on a data storage array. In various embodiments, a cache queue and a data storage array queue may enable a data management module to determine which data blocks may be evicted from cache. In certain embodiments, a cache queue and a data storage array queue may enable a data management module to determine which data blocks from a data storage array may be cached to promote efficient use of the cache.

Figure 5:
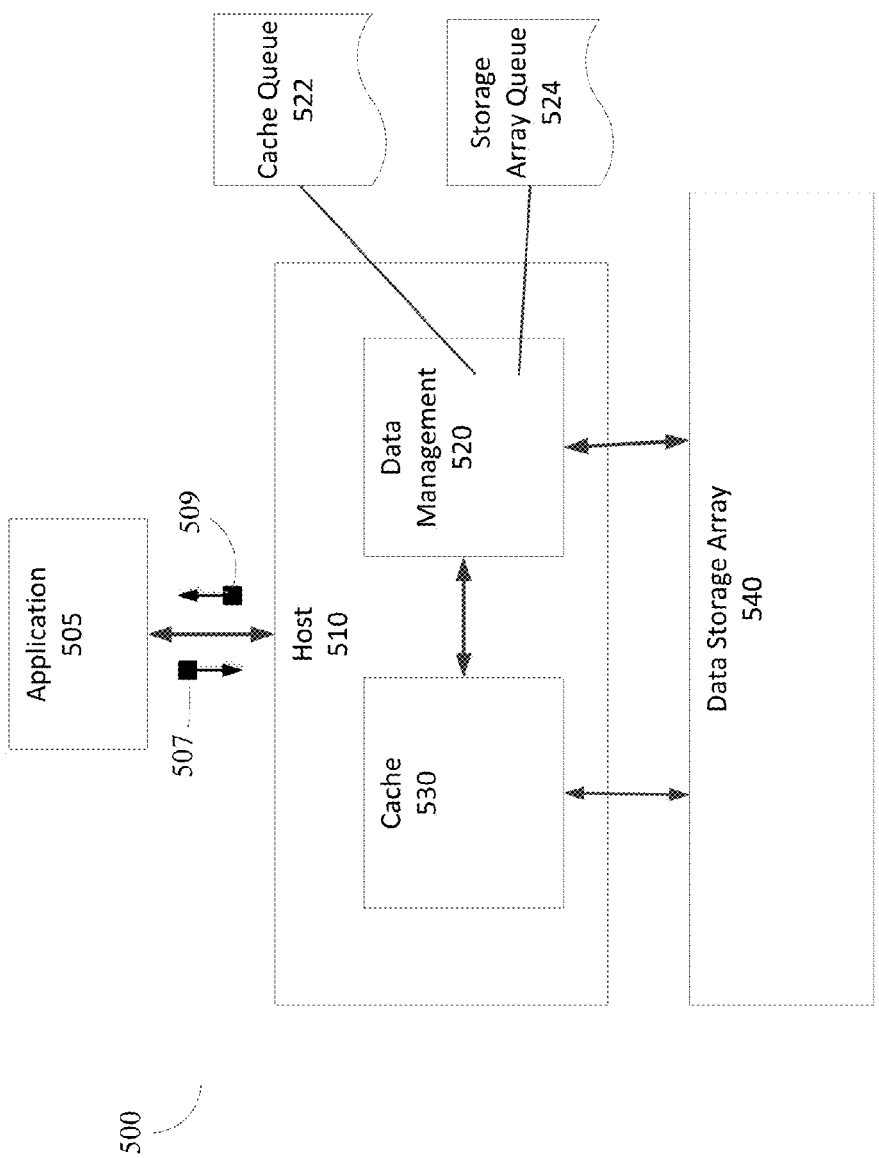
FIG. 5 is a simplified illustration of message processing in a data storage system, in accordance with an embodiment of the present disclosure.

Refer to the example embodiment of FIG. 5. FIG. 5 is a simplified illustration of an application interacting with a data storage system, in accordance with an embodiment of the present disclosure. As shown, data storage system 500 includes host 510 and data storage array 540. Host 510 includes cache 530 and data management module 520. Data management module 520 is enabled to maintain a cache queue 522 and a storage array queue 524 to enable the data management module 520 to make determinations on whether to cache data from data storage array 540 and/or evict data from cache 530. In this embodiment, data management module 520 is enabled to analyze incoming I/Os received in message 507 to determine which portions of cache 530 and which portions of data storage array 540 to manage.

Figure 6:
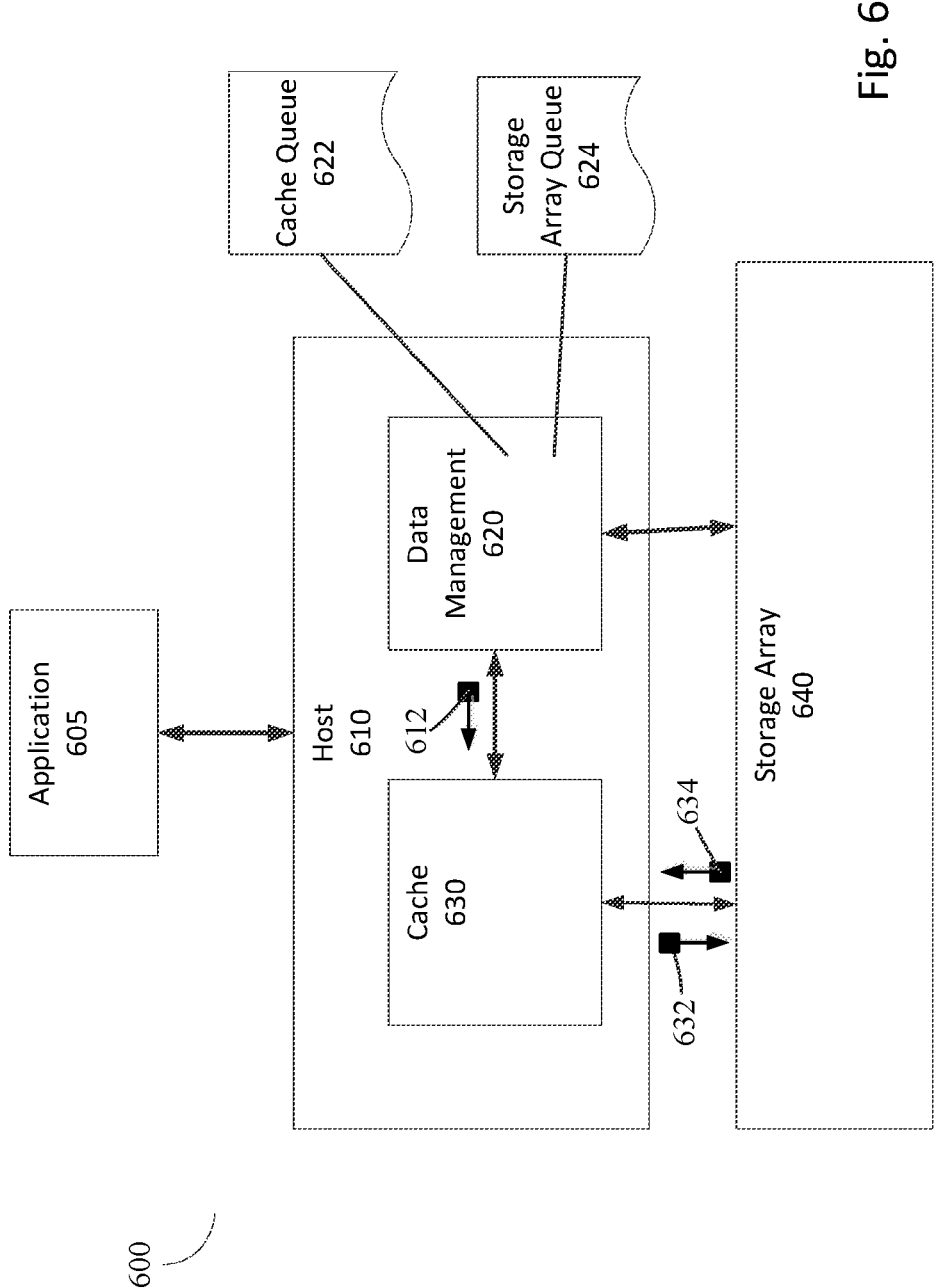
FIG. 6 is a simplified illustration of a data storage system managing caching of data storage, in accordance with an embodiment of the present disclosure.

Refer to the example embodiment of FIG. 6. FIG. 6 is a simplified illustration of a data management module managing data within a data storage system, in accordance with an embodiment of the present disclosure. As shown, data storage system 600 includes host 610 and data storage array 640. Host includes data management module 620 and cache 630. In this embodiment, data management module 620 is enabled to manage cache 630 using message 612. In many embodiments, the data management module may be enabled to direct a caching module to evict one or more portions of data based on analysis of incoming I/Os. In various embodiments, a data management module's cache queue and/or data storage array queue may enable the data management module to determine which portions of cache to evict and which portions of the data storage array to cache. As show, cache 630 is enabled to evict portions of data within cache 630. Cache 630 is enabled to request data from data storage array 640 using message 632. In this embodiment, Cache 630 is enabled to receive data for caching using message 634.

Figure 7:
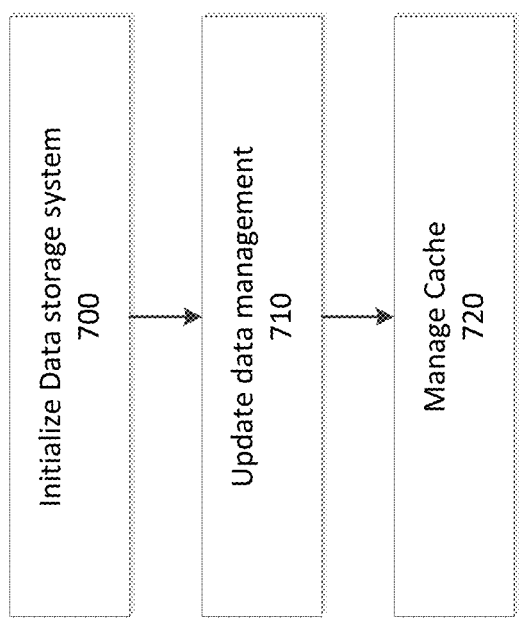
FIG. 7 is a simplified flowchart of a method of managing cache in a data storage system, in accordance with an embodiment of the present disclosure.

Refer to the example embodiments of FIGS. 5 and 7. FIG. 7 is a simplified flowchart of a method of managing a data storage system, in accordance with an embodiment of the present disclosure. Initialization of data storage system 500 (Step 700) includes dividing data storage array 540 into contiguous areas and/or sets to be managed by data management module 520. Initialization includes Data management module 520 creating lists cache queue 522 and data storage array queue 524 to maintain records of how cache 530 and data storage array 540 are being used in data storage system 500. In this embodiment, Application 505 communicates I/O requests to data storage system 500 using message 507. Data management module 520 receives and analyzes each I/O request to update cache queue 522 and data storage array queue 524 (Step 710). Data management module 520 uses cache queue 522 and data storage array queue 524 to manage cache determining whether to move data from data storage array 540 to cache 530 (Step 720).

Figure 8:
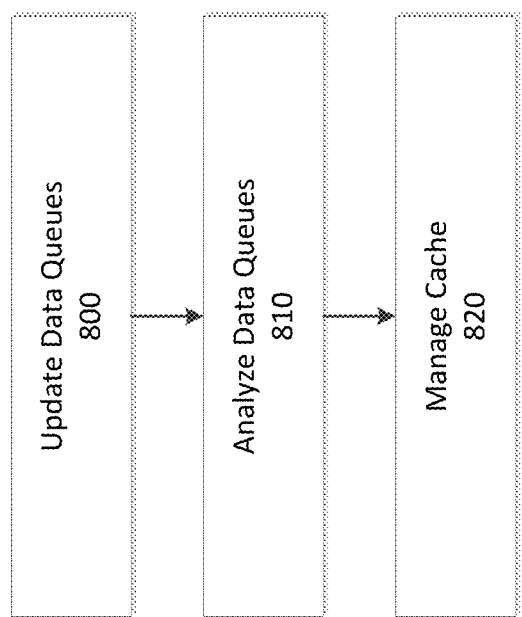
FIG. 8 is an alternative simplified flowchart of a method of managing cache in a data storage system, in accordance with an embodiment of the present disclosure.

Refer to the example embodiments of FIGS. 6 and 8. FIG. 8 is an alternative simplified flowchart of a method of managing data in a data storage system, in accordance with an embodiment of the present disclosure. As shown, data storage system 600 includes host 610 and data storage array 640. Application 605 is utilizing data storage system 600 to fulfill data storage needs of Application 605. In this embodiment, data management module 620 maintains cache queue 622 and data storage queue 624 support analysis of I/Os requests received from Application 605. As shown, cache queue 622 contains references to each portion of data stored within cache 630. Each stored reference in cache queue 622 is ordered by least recently used allowing data management module to determine which portions of cache 630 to evict. Data storage array queue 624 contains references to each portion of data stored within data storage array 640. Each stored reference in data storage array queue 624 is ordered by least recently used allowing data management module to determine which portions of data storage array 640 to cache in cache 630. Upon receiving I/O requests from application 605, data management module 620 updates cache queue 622 and data storage array queue 624 (Step 800). Data management module 620 analyzes cache queue 622 and data storage array queue 624 to determine an efficient allocation of resources (Step 810). In this embodiment, Data management module 620 evicts the least recently used portion of Cache 630 and replaces the evicted portion with a portion from data storage array 640 not already stored in cache 630 (Step 820). As shown, data management predicts future usage and actively manages cache 630 usage.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 9:
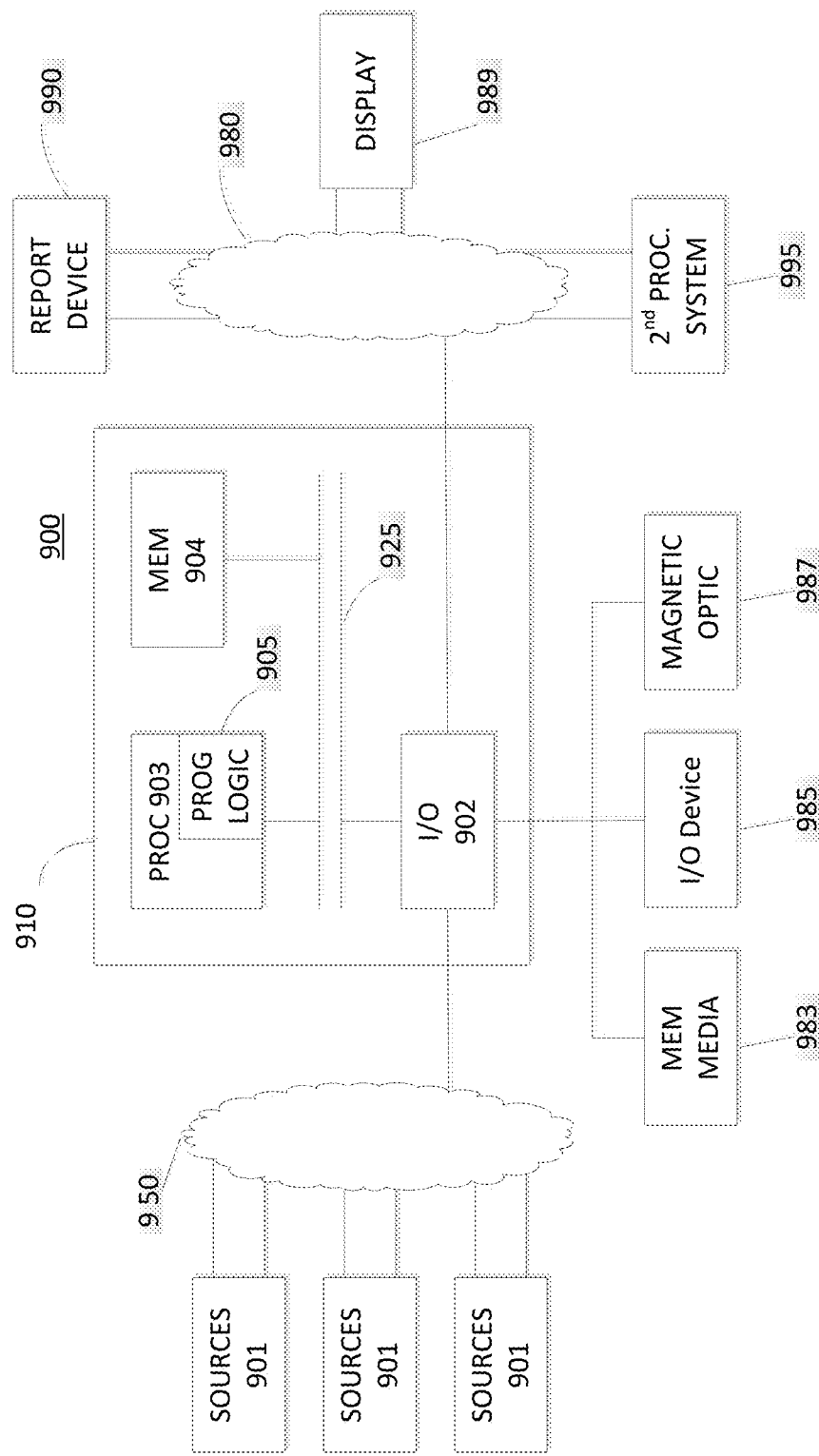
FIG. 9 is an example of an embodiment of an apparatus that may utilize the techniques described herein, in accordance with an embodiment of the present disclosure.

FIG. 9 is a block diagram illustrating an apparatus, such as a computer 910 in a network 900, which may utilize the techniques described herein according to an example embodiment of the present invention. The computer 910 may include one or more I/O ports 902, a processor 903, and memory 904, all of which may be connected by an interconnect 925, such as a bus. Processor 903 may include program logic 905. The I/O port 902 may provide connectivity to memory media 983, I/O devices 985, and drives 987, such as magnetic or optical drives. When the program code is loaded into memory 704 and executed by the computer 910, the machine becomes an apparatus for practicing the invention. When implemented on one or more general-purpose processors 903, the program code combines with such a processor to provide a unique apparatus that operates analogously to specific logic circuits. As such, a general purpose digital machine can be transformed into a special purpose digital machine.

Figure 10:
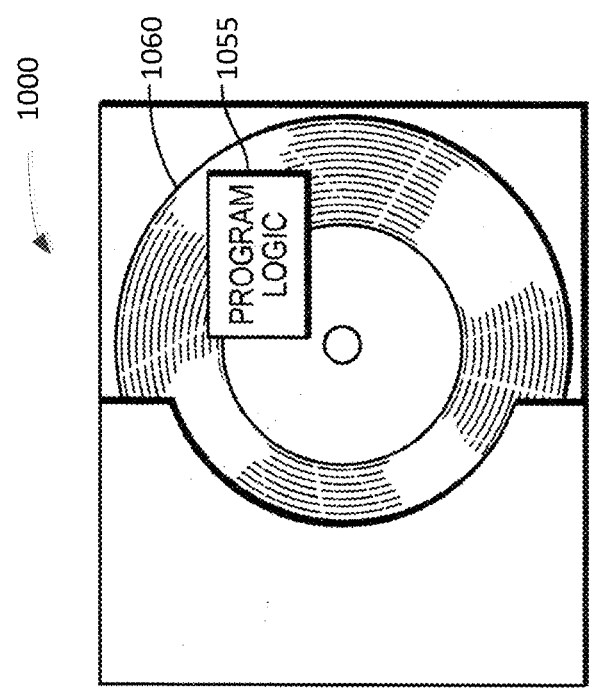
FIG. 10 is an example of a method embodied on a computer readable storage medium that may utilize the techniques described herein, in accordance with an embodiment of the present disclosure.

FIG. 10 is a block diagram illustrating a method embodied on a computer readable storage medium 1060 that may utilize the techniques described herein according to an example embodiment of the present invention. FIG. 10 shows Program Logic 1055 embodied on a computer-readable medium 1060 as shown, and wherein the Logic is encoded in computer-executable code configured for carrying out the methods of this invention and thereby forming a Computer Program Product 1000. Program Logic 1055 may be the same logic 905 on memory 904 loaded on processor 903 in FIG. 9. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-10. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method of managing a data storage system, wherein the data storage system includes a cache and a data storage array, the computer-executable method comprising:
   initializing the cache, wherein the initializing comprises:
      creating a first list related to data stored on the cache; and
      creating a second list related to data stored on the data storage array;
   updating the first list based on received I/O requests;
   updating the second list based on received I/O requests; and
   managing data on the cache based on the first list and the second list.

2. The computer-executable method of claim 1, wherein the first list is ordered by Least Recently Used portion of the data on the cache.

3. The computer-executable method of claim 1, wherein the second list is ordered by Least Recently Used portion of the data on the data storage array.

4. The computer-executable method of claim 1, wherein each element of the second list corresponds to an area of the one or more contiguous areas.

5. The computer-executable method of claim 1, wherein each element of the first list corresponds to a portion of the data on the cache.

6. The computer-executable method of claim 1, wherein updating the first list comprises:
   upon receipt of an I/O request, determining if the I/O request relates to an element in the first list; and
   upon a positive determination, modifying a priority of the element in the first list based on the I/O request.

7. The computer-executable method of claim 1, wherein updating the second list comprises:
   upon receipt of an I/O request, modifying a priority of the element in the first list based on the I/O request.

8. The computer-executable method of claim 1, wherein managing the data on the cache comprises;
   removing a portion of data on the cache associated with a low priority element in the first list; and
   replacing the portion of data with a second portion of data cached from the data storage array, wherein the second portion of data is associated with a high priority element in the second list.

9. A system, comprising:
   a data storage system including a cache and a data storage array; and
   computer-executable logic encoded in memory of one or more computers in communication with the data storage system to enable management of the cache, wherein the computer-executable program logic is configured for the execution of:
   initializing the cache, wherein the initializing comprises:
      creating a first list related to data stored on the cache; and
      creating a second list related to data stored on the data storage array;
   updating the first list based on received I/O requests;
   updating the second list based on received I/O requests; and
   managing data on the cache based on the first list and the second list.

10. The system of claim 9, wherein the first list is ordered by Least Recently Used portion of the data on the cache.

11. The system of claim 9, wherein the second list is ordered by Least Recently Used portion of the data on the data storage array.

12. The system of claim 9, wherein each element of the second list corresponds to an area of the one or more contiguous areas.

13. The system of claim 9, wherein each element of the first list corresponds to a portion of the data on the cache.

14. The system of claim 9, wherein the computer-executable program logic is further configured for the execution of updating the first list, comprising:
   upon receipt of an I/O request, determining if the I/O request relates to an element in the first list; and
   upon a positive determination, modifying a priority of the element in the first list based on the I/O request.

15. The system of claim 9, wherein the computer-executable program logic is further configured for the execution of updating the second list comprises:
   upon receipt of an I/O request, modifying a priority of the element in the first list based on the I/O request.

16. The system of claim 9, wherein the computer-executable program logic is further configured for the execution of managing the data on the cache comprises:
   removing a portion of data on the cache associated with a low priority element in the first list; and
   replacing the portion of data with a second portion of data cached from the data storage array, wherein the second portion of data is associated with a high priority element in the second list.

17. A computer program product for managing a data storage system, wherein the data storage system includes a cache and a data storage array, the computer program product comprising:
   a non-transitory computer readable medium encoded with computer-executable program code for using read signatures in replication, the code configured to enable the execution of:
   initializing the cache, wherein the initializing comprises:
      creating a first list related to data stored on the cache; and
      creating a second list related to data stored on the data storage array;
   updating the first list based on received I/O requests;
   updating the second list based on received I/O requests; and
   managing data on the cache based on the first list and the second list.

18. The computer program product of claim 17, wherein the first list is ordered by Least Recently Used portion of the data on the cache.

19. The computer program product of claim 17, wherein the second list is ordered by Least Recently Used portion of the data on the data storage array.

20. The computer program product of claim 17, wherein each element of the second list corresponds to an area of the one or more contiguous areas.

* * * * *